United States Patent [19]
Trayer

[11] 3,796,098
[45] Mar. 12, 1974

[54] LIQUID LEVEL GAUGE

[76] Inventor: Frank C. Trayer, 25690 LaLanne Ct., Los Altos Hills, Calif. 94022

[22] Filed: Apr. 19, 1972

[21] Appl. No.: 245,373

[52] U.S. Cl................ 73/327, 350/96 R, 350/252
[51] Int. Cl............................................ G01f 23/02
[58] Field of Search.................. 73/327; 116/118 R; 350/96 R, 113, 112, 286; 340/244 R, 380; 85/5 CP

[56] References Cited
UNITED STATES PATENTS

| | | | |
|---|---|---|---|
| 2,943,530 | 7/1960 | Nagel | 350/113 |
| 2,430,616 | 11/1947 | Pearson | 350/112 X |
| 2,949,777 | 8/1960 | Ferron | 350/113 |
| 1,617,932 | 2/1927 | Work et al. | 350/113 |
| 1,883,971 | 10/1932 | Kryzanowsky | 73/327 |
| 3,273,267 | 9/1966 | Willman | 73/327 X |
| 470,507 | 3/1892 | Risser | 85/5 CP |

Primary Examiner—Donald O. Woodiel
Assistant Examiner—Daniel M. Yasich
Attorney, Agent, or Firm—Schapp and Hatch

[57] ABSTRACT

A combination visual liquid level warning gauge and filler plug for liquid filled tanks such as medium voltage switchgear and distribution equipment, having a cylindrical body of transparent material forming the plug which passes through the wall of the tank. The inner end of the cylinder is bevelled into two internally reflecting facets, which reflect a legend from both sides of a generally planar symbol-bearing area which bisects the angle between the facets within the transparent body. The refractive index of the transparent plug is selected to be close enough to that of the liquid in the tank that contact of the liquid with the facets will eliminate the internal reflection from the facets and render the legend invisible from the outer end of the plug. A socket is provided in the wall of the tank to receive the plug, and an expanded head on the plug seats against a collar on the socket to limit the plug movement into the tank. Mating apertures through the plug and collar permit insertion of a retaining pin, which then may be sealed against tampering by a lead seal.

5 Claims, 7 Drawing Figures

PATENTED MAR 12 1974  3,796,098
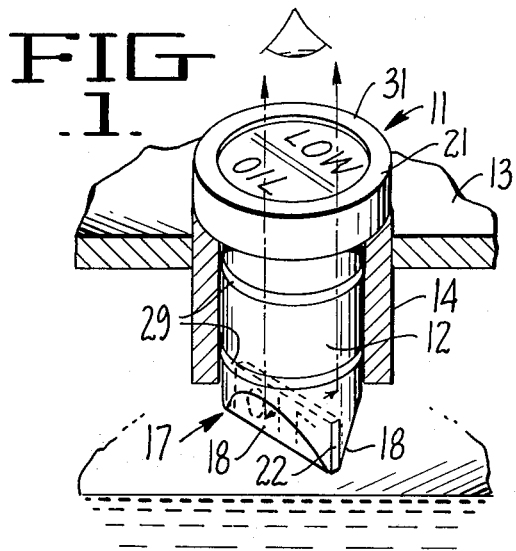
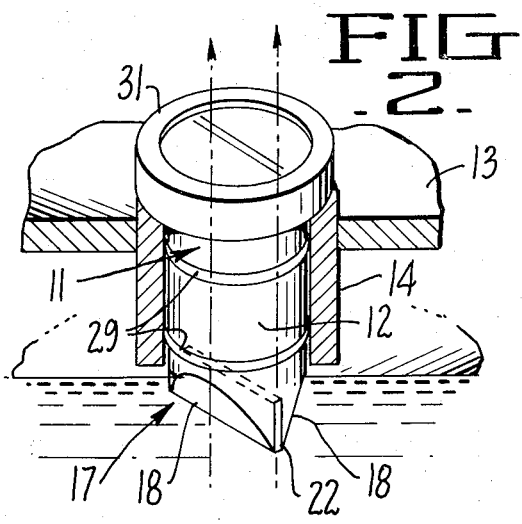
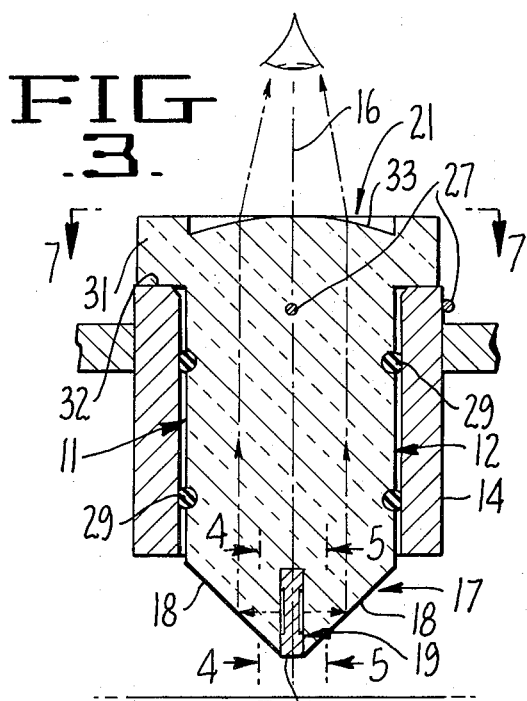
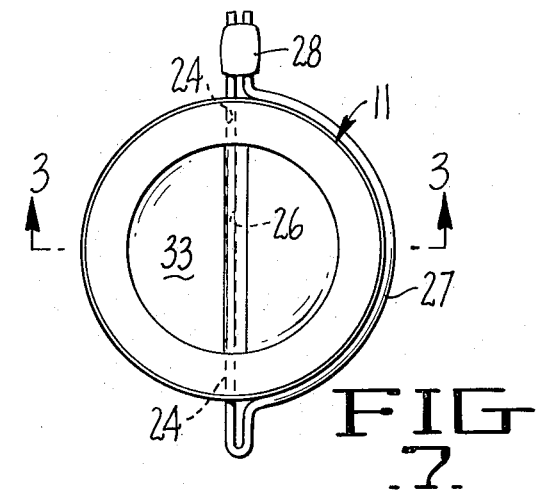
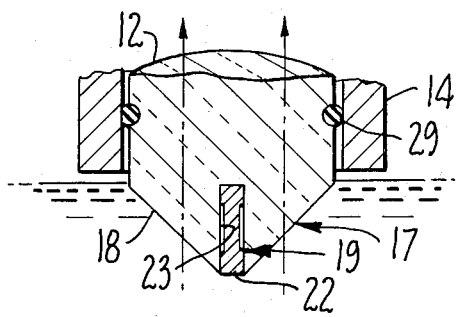
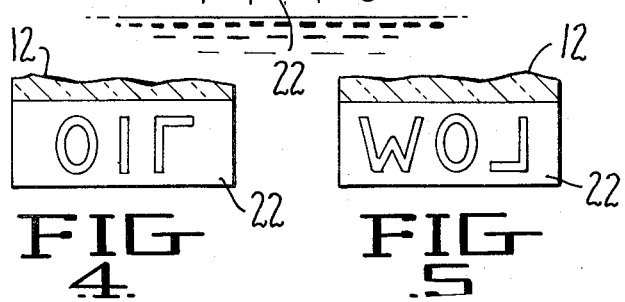

LIQUID LEVEL GAUGE

BACKGROUND OF THE INVENTION

This invention relates to a LIQUID LEVEL GAUGE, and more particularly to a device for giving visual warning of a liquid level in an enclosed tank.

Many enclosed devices depend for their proper functioning on the maintenance of a particular liquid level within the enclosure, and many systems have been developed for gauging such liquid levels. Among such systems, however, few are well adapted for ultra-reliable performance in extremes of weather or for use on hazardous equipment such as medium voltage electrical switch gear and distribution equipment.

Prior art devices have often been too complex for the degree of reliability required, or too expensive for practical application. Others have been susceptible to fouling by the liquid, such as transformer oil, being gauged. Many, too, have been difficult to read or ambiguous in their indication. Ideally, such a gauge should not require an independent power source for its operation, and should not interfere with the integrity of the weatherproofing or submersibility of the device to which it is applied.

SUMMARY OF THE INVENTION

The liquid level gauge of the present invention has no electrical or mechanically active parts, and is sufficiently simple in construction to yield an extremely high reliability. Its simple and self-contained nature and its use of ambient light for illumination render it quite resistant to fouling by the liquid being measured, and permit its use in high hazard applications with safety.

The straightforward nature of the gauge also allows it to be applied to submersible and fully weatherproof enclosures without creating problems in the submersibility. The overall safety of the system protected by the gauge is enhanced by the static nature of the gauge, since it is not dependent upon any power supply or mechanical apparatus for its operation, and since the gauge indication is so directly dependent upon the physical presence or absence of the gauged liquid.

Accordingly, it is a principal object of the present invention to provide a liquid level warning device of the character described which will visually indicate the absence of a desired liquid level within an enclosed tank.

It is a further principal object of the present invention to provide a liquid level warning device of the character described having a very high degree of reliability and independence of environmental factors.

Another object of the present invention is to provide a liquid level warning device of the character described which provides a direct, unambiguous indication of low liquid level without susceptibility to fouling by the liquid, mechanical failure or power supply interruption.

A further object of the present invention is to provide a liquid level warning device of the character described which is simple and inexpensive in its construction, and which will further serve as a tamper-proof fill and inspection port for the tank.

Further objects and advantages of the present invention will become apparent as the specification proceeds, and the new and useful features thereof will be fully defined in the claims attached hereto.

BRIEF DESCRIPTION OF THE DRAWING

The preferred forms of the present invention are illustrated in the accompanying drawing, forming part of this specification, in which FIG. 1 is a perspective view of the liquid level warning device of the present invention, with portions thereof shown in cross-section and portions of the tank to which it is attached shown broken away for clarity, with the liquid level low;

FIG. 2 is a perspective view corresponding to that of FIG. 1, shown with a higher liquid level in the tank;

FIG. 3 is a cross-sectional view on an enlarged scale taken approximately along the plane of lines 3—3 of FIG. 7, showing however a modified form of the head portion of the device;

FIG. 4 is a fragmentary cross-sectional view taken approximately along the plane of lines 4—4 of FIG. 3;

FIG. 5 is a fragmentary cross-sectional view taken approximately along the plane of lines 5—5 of FIG. 3;

FIG. 6 is a fragmentary cross-sectional view corresponding to the lower portion of FIG. 3, shown with the liquid in the tank at a higher level, as in FIG. 2; and FIG. 7 is a top plan view taken approximately along the plane of lines 7—7 of FIG. 3.

While only the preferred forms of the invention have been shown here, it should be understood that various changes or modifications may be made within the scope of the claims attached hereto without departing from the spirit of the invention.

DESCRIPTION OF THE PREFERRED EMBODIMENTS

Referring to the drawings in detail, it may be seen that the liquid level gauge 11 of the present invention includes a body of transparent material 12 disposable through the wall 13 of a tank containing the liquid to be gauged and a receiving socket 14 for the transparent body or plug 12. The socket 14 is mountable in the wall 13 of the tank and so dimensioned as to permit a portion of the body 12 to extend into a region of the tank occupied by the liquid contents of the tank when it is filled to the desired level, while permitting a portion of the body 12 to be seen from outside the tank.

The body or plug 12 has an axis 16 generally corresponding to the normal line of sight from the exterior to the interior of the tank through the socket 14, and a portion of the body 12 within the tank is faceted at an angle to the axis 16. As shown in the present embodiment, the faceted portion of the body 12 is the innermost end 17 of the body 12, with a facet shown at 18. The body 12 bears a legend area 19 therein adjacent the facet 18 and visible from the outer end 21 of the body by reflection of light from the facet 18 to the legend area 19 when the facet 18 is free from contact with the liquid within the tank.

As may be seen from FIGS. 2 and 6, the legend area 19 is rendered invisible when the facet 18 is contacted by the liquid within the tank, as the liquid impedes the necessary internal reflection from the facet to the legend and back by lowering the difference in refractive indices encountered at the facet boundary to the point at which an incident ray parallel to the axis 16 is refracted rather than reflected at the facet. Although the present device is operative if only one facet is formed on the inner end 17 of the plug 12, it has been found advantageous to form two facets opposite each other, and to place a two-sided legend, such as that shown in FIGS. 4 and 5, between the facets.

The most advantageous angle between the facet 18 and the axis 16 has been found to be 45°, especially when the legend area 19 is, as shown here, generally disposed in a plane parallel to the axis 16 and approximately normal to the path of light reflected by the facet from a ray generally parallel to the axis 16. The use of a planar legend area seen edge-on from the outer end 21 of the body 12 eliminates sighting of the legend without reflection from the facet 18. Other facet angles are possible, with the appropriate change in shape of the legend area, for one example, to a triangular prism. Such arrangements increase the possibility of seeing the legend without reflection from a facet, and increase the complexity of the device as well.

A pair of facets 18 are shown here, with the facets generally perpendicular to each other and the legend borne on two sides of an opaque body of material 22 lying between the facets 18 adjacent the inner end of the transparent body 12. This configuration allows reflection of different messages from each side of the body 22, as shown in FIGS. 4 and 5. The legend shown in those figures is, of course, only one of many possible warnings. Note the reversal side for side required of the FIG. 5 legend and the top to bottom reversal required of the FIG. 4.

The opaque body 22 may be formed of a piece of multi-layered plastic of the type known as Lamicoid, having at least two layers of contrasting color, so that engraving of it will produce lettering of one color on a background of another color. In the present application, one desirable combination would be white letters on a red background, red for danger and white for maximum legibility. The rectangular piece of plastic bearing the legend engraved on it may conveniently be cemented into a slot 23 cut in the inner end of the transparent body 12. In such a protected location, the liquid being gauged cannot foul or obscure the readability of the legend. With the legend area in the configuration shown here, edge on to the viewing axis 16, the warning color of the background of the legend is essentially not visible to a viewer looking into the outer end of the body 12, when no reflection is taking place from the facet 18. Once reflection takes place, however, both the written legend and the warning color become visible to the viewer, with the reflection operating to reorient the image of the legend-bearing opaque body 22 to a normal-reading direction.

The socket 14 is formed as a generally cylindrical tube passing through the wall 13 of the tank. A pair of apertures 24 are formed transversely through the outer end of the socket 14, and a matching, generally chordal aperture 26 is formed in the generally cylindrical body of the plug 12 so that the apertures 24 and 26 may be aligned when the transparent plug body 12 is fully inserted into the socket 14. A retaining pin 27 of a generally D-shaped configuration may have the straight leg of the pin inserted through the apertures 24 and 26 to hold the plug 12 in place against internal tank pressure or external tampering. For additional security against tampering, the curved and straight legs of the pin 27 may be brought together and fastened by a lead seal 28.

As here shown, the plug 12 is sealed to the socket 14 by O-ring seals 29 of oil-resistant material such as Neoprene, borne in circumferential grooves on the plug body 12 to maintain the submersible integrity of the tank and its contents. The use of O-ring seals allows the sealing to be independent of the judgment of the operator inserting the plug 12, since the seating force is dependent only on the spacing between the plug 12 and the inner surface of the socket 14. It should be appreciated, however, that the gauge of the present invention could be constructed with mating screw threads on the plug body 12 and the socket 14, with a gasket provided between the head 31 of the plug and the outer end 32 of the socket, to complete the seal. Such an arrangement might well be desirable in applications having high internal pressures in the tank, where the added pressure integrity would offset the advantage of independence of operator judgment shown in the O-ring seal arrangement.

The outer end 21 of the plug body 12 is formed into a head portion 31 of enlarged diameter, which seats against the outer end 32 of the socket 14 to limit the inward motion of the plug 12 in the socket 14. In the form of the invention shown in FIGS. 1 and 2, the top surface of the enlarged head portion is generally flat. In the form shown in FIGS. 3 and 7, a lens is formed by providing a curved top surface 33. The lens allows viewing from off-axis positions, and magnifies the image of the legend area 19. The preferred material for the transparent plug body 12 is Lucite.

From the foregoing, it may be seen that a self-contained liquid level warning device has been provided which will directly and unambiguously visually indicate the absence of a desired liquid level in a tank with a high degree of reliability and independence of the environment. The device resists fouling by the measured liquid and is unaffected by mechanical or power failure, and is simple and inexpensive in its construction.

I claim:

1. A liquid-level gauge for tanks and the like, comprising
a body of transparent material disposable through a wall of the tank, and
a receiving socket for said body, retainingly mountable in a wall of the tank and dimensioned to permit a portion of said body to extend into a region occupied by the liquid contents of the tank when the tank is filled to the desired level, and to permit a portion of said body to be seen from outside the tank,
said body having an axis generally corresponding to the normal line of sight from the exterior to the interior of the tank through said socket, a tip portion of said body within the tank having two facets symetrically arranged at an angle of approximately 45° to said axis, an opaque legend bearing area vertically mounted in said tip portion with opposite sides of the legend area each bearing separate and distinct letters or symbols oriented differently thereon, said letters or symbols of a color contrasting that of said legend area, said legend area being visible from the outer end of said body by reflection from said facets to said legend area of light rays passing generally parallel to said axis when said facets are free from contact with liquid within said tank, whereby said legend area will be rendered invisible when said facets are contacted by liquid contents of said tank to impede light reflection therefrom.

2. A liquid level gauge as described in claim 1, and wherein said two facets are approximately perpendicular to each other.

3. A liquid level gauge as described in claim 2, and wherein said legend area is borne on two sides of said opaque body of material located adjacent the inner end of said transparent body and between said two facets, whereby said legend will be readable in normal orientation along said axis after reflection of one side of said opaque body by each of said facets when said facets are free of contact with liquid contents of the tank.

4. A liquid level gauge as described in claim 1, and wherein said gauge further comprises a retaining pin insertable through mating apertures in said body and said socket to retain said body in said socket without obstructing the view of said legend from the exterior of the tank.

5. A liquid level gauge as described in claim 1, and wherein said gauge further comprises at least one O-ring seal between said transparent body and said socket, and a retaining pin, said socket being formed as a cylindrical tube passing through the wall of the tank, said transparent body being formed as a cylindrical body fitting within said cylindrical tube and sealed therebetween by said O-ring seal, said transparent body having an enlarged head portion adapted to seat against the outer end of said socket to limit inward motion of said transparent body in said socket, said outer end of said socket having two transverse apertures therethrough along a chord of said cylindrical socket, said transparent body having a chordal aperture therethrough mating with said apertures in said socket, said apertures being dimensioned to permit passage of said retaining pin therethrough without obstructing the view of said legend from the exterior of the tank.

* * * * *